United States Patent

[11] 3,612,363

| [72] | Inventor | Paul H. Carter |
| | | Baltimore, Md. |
| [21] | Appl. No. | 863,832 |
| [22] | Filed | Oct. 6, 1969 |
| [45] | Patented | Oct. 12, 1971 |
| [73] | Assignee | Maryland Cup Corporation |
| | | Owings Mills, Md. |

[54] LIQUID DISPENSING MACHINE
9 Claims, 5 Drawing Figs.

| [52] | U.S. Cl. | 222/426, 222/450 |
| [51] | Int. Cl. | G01f 11/28 |
| [50] | Field of Search | 222/450, 426, 451 |

[56] References Cited
UNITED STATES PATENTS

| 1,493,925 | 5/1924 | Du Charme | 222/450 |
| 1,595,822 | 8/1926 | Du Charme | 222/450 X |
| 2,396,527 | 3/1946 | Osborne | 222/450 X |
| 2,602,576 | 7/1952 | Spruck | 222/450 X |

FOREIGN PATENTS

| 461,801 | 2/1937 | Great Britain | 222/426 |
| 681,241 | 10/1952 | Great Britain | 222/450 |

*Primary Examiner*—Lloyd L. King
*Attorney*—Birch & Birch

ABSTRACT: A liquid dispensing machine comprises a series of tubes connected to the bottom of a liquid tank. The tubes have plugs at their tops and bottoms, and means are provided for opening either the top or the bottom plugs exclusively from a position where both plugs are closed. This permits first the filling of the tubes with a given amount of liquid and then discharging the given amount of liquid into receptacles at the bottoms of the tubes.

INVENTOR
PAUL H. CARTER

BY Albert J. Kramer

ATTORNEY

INVENTOR
PAUL H. CARTER

BY Albert J. Kramer

ATTORNEY

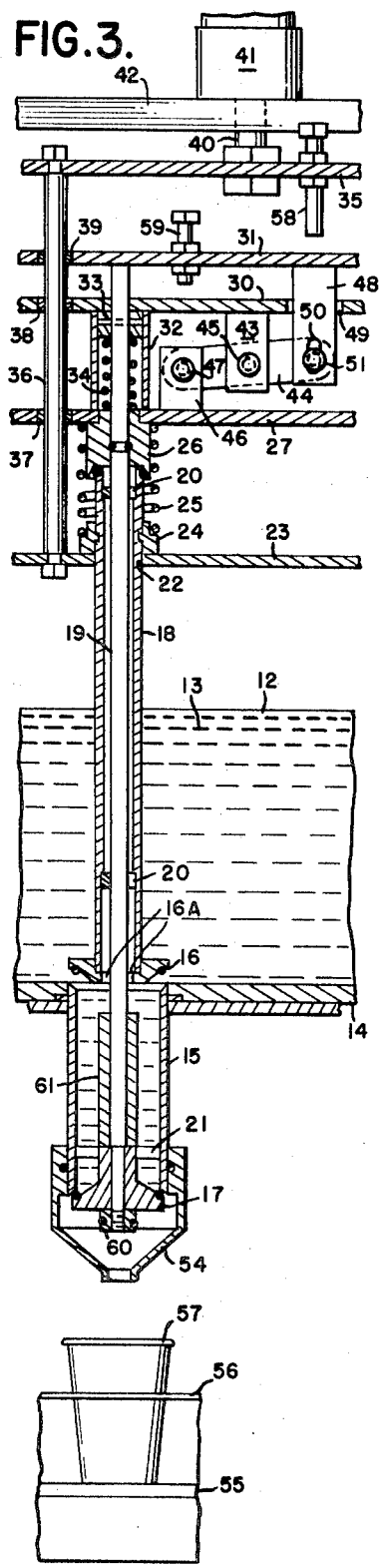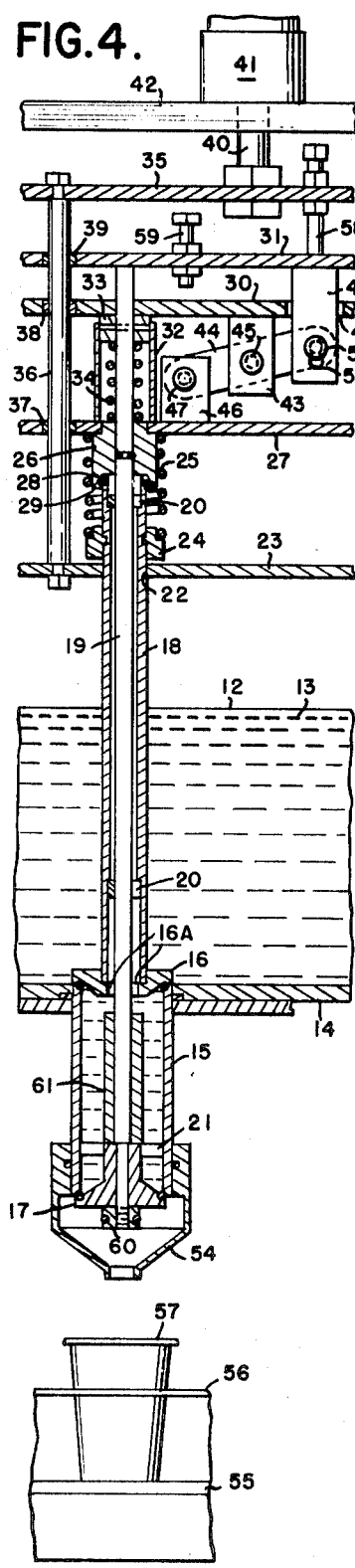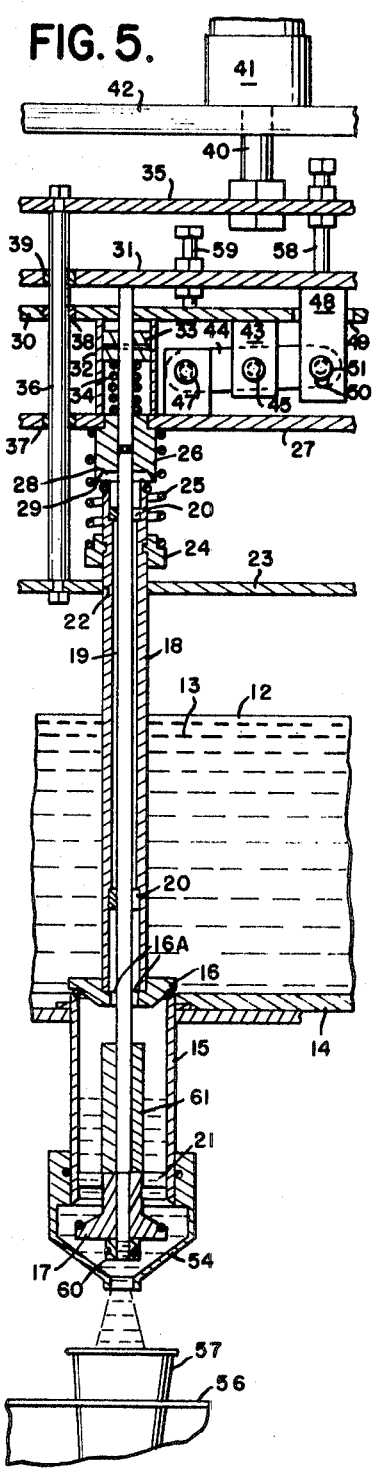

LIQUID DISPENSING MACHINE

This invention relates to dispensing machines and it is more particularly concerned with a machine for filling containers with liquids.

An object of the invention is the provision of a machine for dispensing equal volumes of liquid into containers.

Another object is the provision of a dispensing machine which is capable of dispensing a given amount of liquid into a plurality of containers with equal volumes of liquid simultaneously.

A further object is the provision of a dispensing machine that can be adjusted to deliver different equal volumes of liquid as desired.

A still further object of the invention is the provision of a dispensing machine which is positive in operation, simple and reliable to use, and which is unlikely to get out of working order over prolonged periods of operation.

These and still further objects, features and advantages of the invention will be apparent from the following description, considered together with the accompanying drawings.

In the drawing:

FIGS. 3, 4 and 5 are similar fragmentary views of the embodiment, partly in section, illustrating the operation of the invention.

Figure 1:
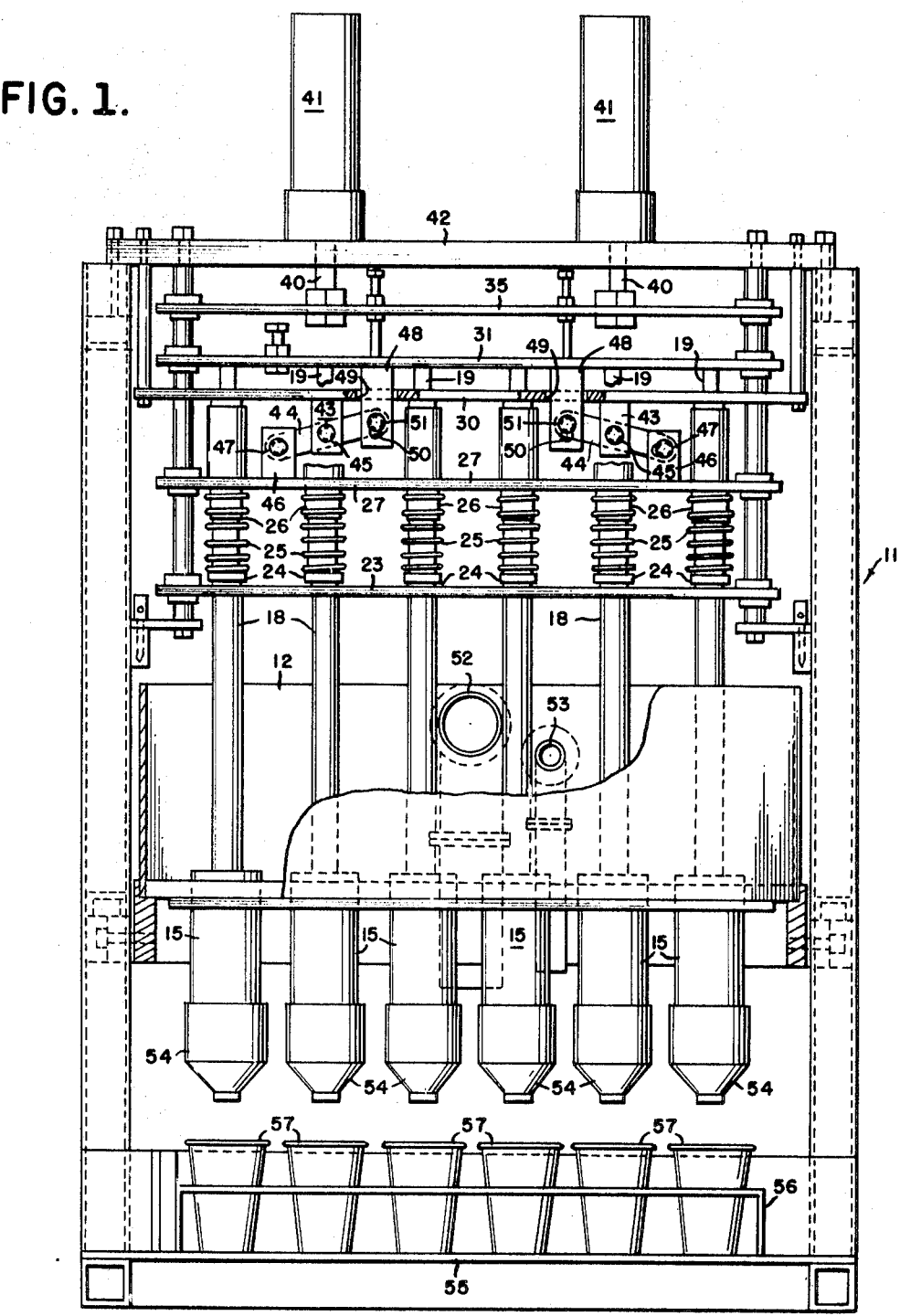
FIG. 1 is a front elevational view of an embodiment of the invention.
Figure 2:
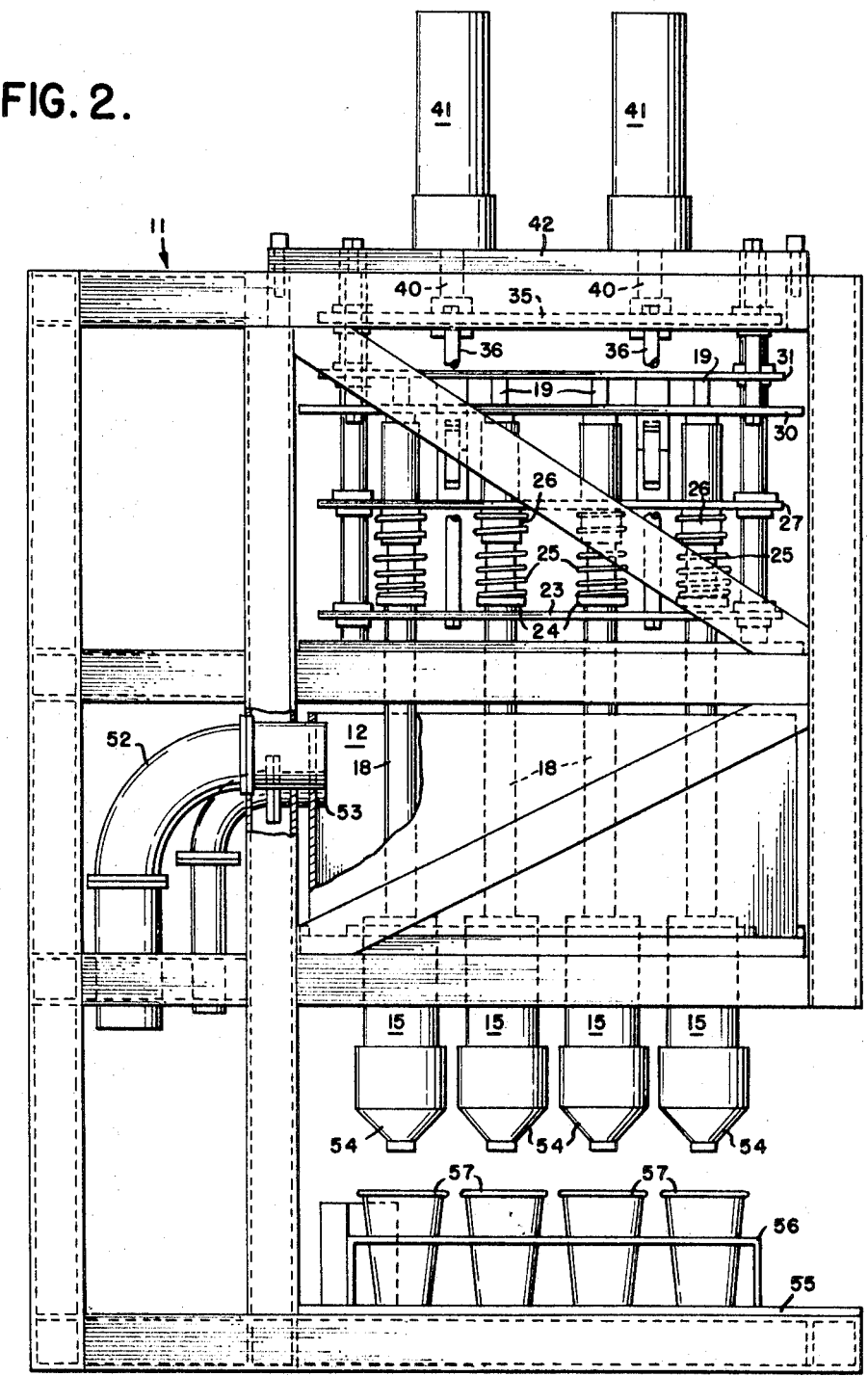
FIG. 2 is a side elevational view of the embodiment.

The embodiment illustrated in the drawing comprises a frame structure 11 on which there is supported a tank 12 adapted to hold a liquid to be dispensed.

The flat bottom wall 14 of the tank 12 is provided with an array of openings, each opening being connected to the upper end of a tube 15 into which the liquid 13 passes from the tank. Each tube is of identical size and holds a predetermined quantity of liquid, e.g., 6 ounces.

The top of each tube is provided with a closure plug 16, and the bottom with a closure plug 17. Each plug 16 is supported on the bottom of a hollow rod 18 and each plug 17 is supported on the bottom of a solid rod 19. Each rod 19 is slidably disposed coaxially in a corresponding hollow rod 18. Suitable bearings 20 are provided between the rods 18 and 19 and a guide member 21 of spaced radial arms is mounted on the rod 19 in slidable contact with the tube 15.

The upper ends of the rods 18 extend upwardly through apertures 22 of a lower vertically movable horizontal plate 23. A rabbetted collar 24 is secured to the upper end of each rod 18 for seating the lower end of a coil spring 25. The upper end of the spring 25 engages a block 26 which is secured to the bottom of a second vertically movable horizontal plate 27. The lower end of a block 26 has an annular recess 28 with an outwardly flared sidewall 29 facing the upper end of the rod 18 and being adapted to abut the upper end of the rod 18.

Each rod 19 extends upwardly through the rod 18, through block 27, and through a horizontal fixed plate 30 above the plate 27. The upper ends of the rods 19 abut a vertically movable horizontal plate 31 above the fixed plate 30.

A vertical tube 32 is secured to the plate 27 coaxially about the rod 19. A slide block 33 is disposed in the tube 32 and it is secured to the rod 19. Between the block 33 and the plate 27 a coil spring 34 is disposed about the rod 19 to urge the rod upwardly in abutting engagement with the plate 31.

An upper vertically movable horizontal plate 35 is dispensed above the plate 31 and it is connected to the lower plate 23 by vertical tie rods 36. The plates 27, 30 and 31 are slidable mounted on the tie rods 36 by means of bearings 37, 38 and 39, respectively.

The upper plate 35 is secured to the piston rods 40 of coacting air cylinders 41 which are mounted on a fixed frame member 42 above the plate 35.

The fixed plate 30 is secured to downwardly projecting brackets 43 to which brackets levers 44 are fulcrumed by a pin 45. One end of each lever 44 is pivotally connected to a bracket 46 secured to the top of the plate 27 by a pin 47. The other end of the lever 44 is connected to a bracket 48 secured to plate 31. The bracket 48 projects downwardly through an opening 49 of the fixed plate 30 and it is provided with a vertical slot 50 in which a pin 51 projecting from the lever 44 is slidably disposed.

The tank 12 has a liquid inlet 53 and an outlet overflow 52. The inlet 53 is connected to a conventional liquid pump (not shown) which pumps liquid from a conventional reservoir (not shown) into the tank 12. The overflow 53 returns excess liquid to the reservoir.

The lower ends of the tubes 15 are provided with snap engageable discharge nozzles 54 above a platform 55 which is adapted to support a tray 56 of cups 57 into which liquid is to be dispensed.

From a neutral position in which both plugs 16 and 17 are in closed positions and in which the block 26 is closed against the upper end of the tube 18 as shown in FIG. 4, actuation of the air cylinder piston rod 40 upward (see FIG. 3) causes the upper plug 16 to open without disturbing the closed relationship between the upper end of the tube 18 and the block 26, leaving the lower plug 17 closed. This permits liquid to flow from the tank 12 into the tubes 15. The closure of the block 26 on the upper end of the tube 18 prevents liquid in the tank from flowing into the lower end of the tube 18. When the tube 15 has been filled, the air cylinder is actuated in the opposite direction which causes the upper plug 16 first to close the top of the tube 15 (see FIG. 4) and then, in sequence, the lower plug 17 to open while the block 26 is lifted off the upper end of the tube 18 (see FIG. 5), whereupon the exact contents of the tube 15 is discharged through the nozzle 54 into the cup 57. The opening of the upper end of the tube 18 provides atmospheric venting of the tube 15 through vent holes 16A of plug 16 which insures the flow of liquid out of the tube 15. Such venting is made possible by the spider type bearings 20 which permits atmospheric communication throughout the length of the tube 18.

Adjustable posts 58 are secured to the plate 35 to abut the plate 31 on the downstroke of the piston rod 40 and limit pins 59 are adjustably secured to plate 31 to adjust the limit of movement of the plate 31 relative to the plate 30.

The bottom closure plug 17 is removably secured to the rod 19 by means of a nut 60. To decrease the volume of liquid in the tube 15 the plug 17 is removed by removing the nut 60 and a cylinder 61 of a predetermined volumetric displacement is disposed on each rod 19. The plug 17 is then replaced beneath the cylinder with the nut 60.

I claim:

1. A liquid dispensing machine comprising a frame structure, a tank supported by the frame structure for holding a liquid to be dispensed, an outlet tube extending from the bottom of the tank, said outlet tube having a uniform bore throughout its length with an internal volume corresponding to a predetermined quantity of liquid to be dispensed, closures at either end of said tube, said closures being carried by rod means, a linkage including rods for holding both closures in their closed positions and for constraining the opening of either closure exclusively of the other closure from said closed positions, and a detachable discharge nozzle at the lower end of the tube, said nozzle enclosing the closure for the lower end of said tube said closure opening outwardly from the lower end of the tube into said nozzle.

2. A liquid dispensing machine as defined by claim 1 in which means are interchangeably mounted in the outlet tube for changing the internal volume of the outlet tube.

3. A liquid dispensing machine as defined by claim 1 in which an insert member comprising a cylinder of a predetermined volumetric displacement is disposed in contiguous relation to the lower closure means in the outlet tube to change its internal volume.

4. A liquid dispensing machine as defined by claim 1 in which the rods attached to the closure means of the tubes at one end are connected to a moveable plate and the rods attached to the closure means of the tubes at the other end are connected to a separate moveable plate, and means for moving said plates relative to each other to constrain the opening of the closure means at either of the ends of the tubes from the closed position of the closure means at both ends.

5. A liquid dispensing machine as defined by claim 4 in which the linkage comprises a lever fulcrumed between its ends, the ends of the lever being pivotally connected to the plates, respectively.

6. A liquid dispensing machine as defined by claim 5 and operatively connected power means for actuating the lever.

7. A liquid dispensing machine as defined by claim 6 in which the power means comprises a fluid actuatable cylinder.

8. A liquid dispensing machine as defined by claim 1 having a plurality of outlet tubes extending from the bottom of the vessel, each tube having closure tubes at either end, a discharge nozzle at the lower end of each tube, rods attached to the closure plugs, a moveable plate connected to all the rods of the plugs at one end of the tubes, another moveable plate connected to all the rods of the plugs at the other ends of the tubes, a fixed frame structure for moveably supporting the plates and tank, a lever connecting said plates, the fulcrum of said lever being connected to the frame structure.

9. A liquid dispensing machine as defined by claim 4 in which the rods attached to the closure means at one end of the tubes are hollow and the rods attached to the closure means at the other ends of the tubes are solid, said solid rods being slidably disposed in the hollow rods, respectively.